United States Patent Office 3,743,655
Patented July 3, 1973

3,743,655
PREPARATION OF 2-ALKYL-4-OZO-2,3,4,5,6,7-HEXAHYDROBENZO[b]THIOPHENES
Jerry G. Strong, Westfield, N.J., assignor to Mobil Oil Corporation
No Drawing. Filed Feb. 16, 1970, Ser. No. 11,896
Int. Cl. C07d 63/22
U.S. Cl. 260—332.3 P    4 Claims

ABSTRACT OF THE DISCLOSURE

2 - alkyl - 4 - oxo-2,3,4,5,6,7-hexahydrobenzo[b]thiophenes and alkyl ($C_1$–$C_3$) substituted derivatives are prepared by reacting 2-allyl-3-chloro-2-cyclohexen-1-one or a derivative thereof having alkyl substituents on the allyl side chain with sodium hydrosulfide to effect ring closure. The oxo-compounds so produced can be dehydrogenated to produce alkyl-substituted-2,3-dihydro-4-hydroxybenzo[b]thiophene and converted to carbamate insecticides.

BACKGROUND OF THE INVENTION

Field of the invention

This invention is concerned with novel alkyl-substituted 4-oxo-2,3,4,5,6,7-hexahydrobenzo[b]thiophenes and their preparation.

Description of the prior art

Insofar as is now known, the process of this invention and the products thereof have not been described in the prior art. In fact, the starting reactants used to make the compounds of this invention are new compounds and are disclosed and claimed in copending application Ser. No. 11,898 filed concurrently herewith in the name of Jerry G. Strong, and entitled: "2-Allyl-3-Chloro-2-Cyclohexen-1-ones."

SUMMARY OF THE INVENTION

This invention provides 4-oxo-2,3,4,5,6,7-hexahydrobenzo[b]thiophenes having the formula:

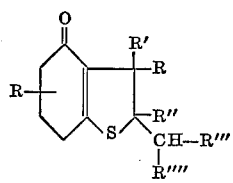

wherein R, R', R", and R'" are hydrogen or alkyl ($C_1$–$C_3$).

It also provides a method for producing the 4-oxo-2,3,4,5,6,7-hexahydrobenzo[b]thiophenes that comprises reacting a compound having the formula:

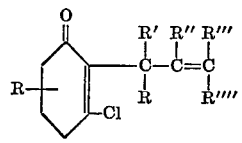

wherein R, R', R", R'", and R"" are hydrogen or alkyl ($C_1$–$C_3$), with sodium hydrosulfide.

DESCRIPTION OF SPECIFIC EMBODIMENTS

Non-limiting examples of the alkyl-substituted 4-oxo-2,3,4,5,6,7-hexahydrobeno[b]thiophenes of this invention are:

2-methyl-4-oxo-2,3,4,5,6,7-hexahydrobenzo[b]thiophene;
2,2-dimethyl-4-oxo-2,3,4,5,6,7-hexahydrobenzo[b]thiophene;
2-methyl-2-ethyl-4-oxo-2,3,4,5,6,7-hexahydrobenzo[b]thiophene;
2-methyl-2-propyl-4-oxo-2,3,4,5,6,7-hexahydrobenzo[b]thiophene;
2-ethyl-4-oxo-2,3,4,5,6,7-hexahydrobenzo[b]thiophene;
2-methyl-2-isopropyl-4-oxo-2,3,4,5,6,7-hexahydrobenzo[b]thiophene;
2-isopropyl-4-oxo-2,3,4,5,6,7-hexahydrobenzo[b]thiophene;
2-propyl-4-oxo-2,3,4,5,6,7-hexahydrobenzo[b]thiophene;
2-propyl-3-methyl-4-oxo-2,3,4,5,6,7-hexahydrobenzo[b]thiophene;
2,3-dimethyl-4-oxo-2,3,4,5,6,7-hexahydrobenzo[b]thiophene;
2-methyl-3-ethyl-4-oxo-2,3,4,5,6,7-hexahydrobenzo[b]thiophene;
2-methyl-3-propyl-4-oxo-2,3,4,5,6,,7-hexahydobenzo[b]thiophene;
2,3,3-trimethyl-4-oxo-2,3,4,5,6,7-hexahydrobenzo[b]thiophene;
2,2,3-trimethyl-4-oxo-2,3,4,5,6,7-hexahydrobenzo[b]thiophene;
2,3-dimethyl-3-ethyl-4-oxo-2,3,4,5,6,7-hexahydrobenzo[b]thiophene;
2-methyl-3,3-diethyl-4-oxo-2,3,4,5,6,7-hexahydrobenzo[b]thiophene;
2,2-dimethyl-3-ethyl-4-oxo-2,3,4,5,6,7-hexahydrobenzo[b]thiophene;
2-methyl-7-propyl-4-oxo-2,3,4,5,6,7-hexahydrobenzo[b]thiophene; and
2,2,6-trimethyl-4-oxo-2,3,4,5,6,7-hexahydrobenzo[b]thiophene.

Although the compounds of this invention and their preparation are similar to the disclosure of copending application Ser. No. 819,982, filed Apr. 28, 1969, there are marked differences. The preparation reactions described herein are effected in much shorter residence times. The products are more stable and are more readily dehydrogenated to the corresponding hydroxybenzothiophenes, the carbamates of which are effective insecticides. Application of the process described in Ser. No. 819,982, to the hereindescribed starting reactant returns only starting material.

One of the starting reactants for preparing the compounds of this invention is a compound having the formula:

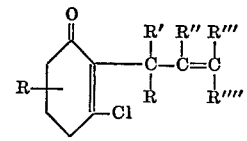

wherein R, R', R", R'", and R"" are hydrogen or an alkyl ($C_1$–$C_3$). Such reactant compounds are 2-allyl-3-chloro-2-cyclohexen-1-one and derivatives thereof having alkyl ($C_1$–$C_3$) substituents on the allyl side chain. For simplicity and uniformity in nomenclature, the derivatives will be named on the basis of the allyl side chain. Typical reactant compounds contemplated are:

2-allyl-3-chloro-2-cyclohexen-1-one;
2-methallyl-3-chloro-2-cyclohexen-1-one;
2-(2-ethylallyl)-3-chloro-2-cyclohexen-1-one;

2-(2-propylallyl)-3-chloro-2-cyclohexen-1-one;
2-(3-methylallyl)-3-chloro-2-cyclohexen-1-one;
2-allyl-3-chloro-4-propyl-2-cyclohexen-1-one;
2-methallyl-3-chloro-5-methyl-2-cyclohexen-1-one;
2-(2,3,3-trimethylallyl)-3-chloro-2-cyclohexen-1-one;
2-(2,3-dimethylallyl)-3-chloro-2-cyclohexen-1-one;
2-(3,3-dimethylallyl)-3-chloro-2-cyclohexen-1-one;
2-(3-ethylallyl)-3-chloro-2-cyclohexen-1-one
2-(2-methyl-3-ethylallyl)-3-chloro-2-cyclohexen-1-one;
2-(1-methylallyl)-3-chloro-2-cyclohexen-1-one;
2-(1-methyl-1-ethylallyl)-3-chloro-2-cyclohexen-1-one;
2-(1,2-dimethylallyl)-3-chloro-2-cyclohexen-1-one;
2-(1-ethylallyl)-3-chloro-2-cyclohexen-1-one;
2-(1,1-diethylallyl)-3-chloro-2-cyclohexen-1-one;
2-(1,1-dimethylallyl)-3-chloro-2-cyclohexen-1-one; and
2-(1-propylallyl)-3-chloro-2-cyclohexen-1-one.

The starting 2-allyl-3-chloro-2-cyclohexen-1-one derivatives can be prepared in three steps, commencing with resorcinol. In the first step, resorcinol is reduced to 1,3-cyclohexanedione (dihydroresorcinol). A typical procedure is reduction over Raney nickel, such as is described in Organic Syntheses, Collective Volume 3, page 278 (John Wiley and Sons, Inc., New York). The 1,3-cyclohexanedione is then allylated with allyl bromide (or chloride) or an alkyl derivative thereof to produce a 2-allyl-1,3-cyclohexanedione using well-known methods. Typical procedures are described, for example in Chem. Ber., 94, 2394 (1961). In a typical example, illustrated with allyl alkylation, 59.5 g. (0.49 mole) allyl bromide was added gradually, to a cooled solution of 64.8 g. (0.58 mole) 1,3-cyclohexanedione and 32.4 g. (0.58 mole) potassium hydroxide in 130 cc. water using rapid stirring. When clumps of needle-like crystals started to form, addition of allyl bromide was stopped and 20 percent aqueous potassium hydroxide was added until solution was effected. Addition of allyl bromide was then completed in about 10 hours. The reaction mixture was added to 200 cc. of one normal sodium hydroxide. The solution was extracted with three portions of petroleum ether. The aqueous solution was ice cooled and adjusted to pH 5 with concentrated hydrochloric acid. Crystals were filtered off and water washed. Recrystallization from methanol/water (1:3) gave fine needles of 2-allyl-1,3-cyclohexanedione melting at 128° C. Using this technique, substituted-allyl derivatives can be made using the appropriate substituted allyl bromide or chloride.

In an additional example of methallyl alkylation a 91 g. (1.0 mole) portion of methallyl chloride was added to a solution of 123 g. (1.1 mole) of 1,3-cyclohexanedione, and 62 g. (1.1 mole) of potassium hydroxide in 250 ml. water using rapid stirring. The reaction mixture was stirred at ambient temperature for 6 days before sufficient 20 percent potassium hydroxide was added to effect solution. The basic solution was extracted with three protions of petroleum ether, and the remaining aqueous solution was cooled and adjusted to pH 5 with concentrated hydrochloric acid. The separated crystals were collected, washed with water, and dried to afford 91 g. of 2-methallyl-1,3-cyclohexanedione melting at 113–114°.

The 2-allyl-3-chloro-2-cyclohexen-1-one or an alkyl derivative is prepared by the reaction of phosphorus oxychloride with the 2-allyl-1,3-cyclohexanedione. The techniques involved are demonstrated in the following examples:

EXAMPLE 1

A 91 g. (0.6 mole) portion of phosphorus oxychloride was added dropwise to a solution of 46 g. (0.3 mole) of 2-allyl-1,3-cyclohexanedione and 52 g. of N,N-dimethylaniline in 300 ml. of chloroform so as to control the temperature near 40° C. Following 4 hours of stirring at ambient temperature, the reaction solution was gently concentrated and cautiously poured over cracked ice so as to control the temperature near 40° C. The resulting mixture was thoroughly extracted with ether, and the ethereal solution was washed with 5% sodium hydroxide and with brine, dried and concentrated. The clear liquid obtained weighed 40 g. and was distilled through a short path apparatus to afford 34 g. (0.2 mole; 70%) of 2-ally-3-chloro-2-cyclohexen-1-one: B.P. 66–69° (0.2 mm.); λ (film) 5.98 (S) μ.

EXAMPLE 2

A 121 g. (0.8 mole) portion of phosphorus oxychloride was allowed to react with 66 g. (0.4 mole) of 2-methallyl-1,3-cyclohexanedione and 70 g. of N,N-dimethylaniline in 400 ml. of chloroform using the same procedure as described in Example 1. Obtained by the same isolation procedure was 45 g. (0.25 mole; 62%) of 2-methallyl-3-chloro-2-cyclohexen-1-one: B.P. 64–70° (0.15 mm.); λ (film) 5.95μ.

The 4-oxo-2,3,4,5,6,7-hexahydrobenzo[b]thiophene compounds of this invention are prepared by reacting 2-allyl-3-chloro-2-cyclohexen-1-one, or an alkyl substituted derivative thereof, with sodium hydrosulfide at ambient temperatures. It is advantageous to use pressure, although atmospheric pressures have been used successfully.

It is advantageous to use a non-polar solvent for the cyclohexenone reactant, such as benzene, toluene, or xylene, or polar solvents, such as lower alcohols. The reaction is carried out in the presence of a basic catalyst. Suitable catalysts include inorganic bases, such as sodium hydroxide and potassium hydroxide; amines, such as triethylamine; and organic bases, such as benzyltrimethylammonium methoxide, benzyltrimethylammonium hydroxide, and sodium alkoxide.

EXAMPLE 3

A solution of sodium hydrogen sulfide was freshly prepared by passing a stream of hydrogen sulfide through a solution of 3.5 g. (0.15 mole) of sodium in 150 ml. of methanol for 2 hours. To this stirred solution was added over 0.5 hour a solution of 25.5 g. (0.15 mole) of 2-allyl-3-chloro-2-cyclohexen-1-one in 50 ml. of methanol. Following the initial exotherm, a 5 g. portion of triethylamine was added, hydrogen sulfide was passed through the then heterogeneous mixture, and the reaction was warmed to 35°. After another 2 hours, the reaction solution was decanted and gently concentrated. The resulting reddish oil was mixed with 100 ml. of benzene, filtered and concentrated. The remaining liquid was distilled through a short path apparatus to afford 17.4 g. (0.1 mol; 70%) of 2-methyl-4-oxo-2,3,4,5,6,7-hexahydrobenzo[b]thiophene: B.P. 95–105° (1.5 mm.); λ (film) 6.05μ; δ; (CDCl$_3$) 3.8 (1H), 3.3 to 1.8 (8H), 1.37 (3H, doublet).

*Analysis.*—Calcd. for C$_9$H$_{12}$OS (percent): C, 64.27; H, 7.19. Found (percent): C, 64.40; H, 7.25.

EXAMPLE 4

The reaction of sodium hydrogen sulfide, prepared from 3.5 g. (0.15 mole) of sodium and hydrogen sulfide in 150 ml. of methanol, with 28 g. (0.15 mole) of 2-methallyl-3-chloro-2-cyclohexen-1-one was allowed to proceed in the manner described in Example 3. The reddish oil which was isolated according to the described method was distilled through a short path apparatus to afford 19 g. (0.11 mole; 73%) of 2,2-dimethyl-4-oxo-2,3,4,5,6,7-hexahydrobenzo[b]thiophene: B.P. 84–92° (0.1 mm.); λ (film) 6.05μ; δ (CDCl$_3$) 2.82 (2H), 2.6 to 1.9 (6H), 1.5 (6H, singlet).

*Analysis.*—Calcd. for C$_{10}$H$_{14}$OS (percent): C, 65.91; H, 7.74. Found (percent): C, 66.20; H, 7.85.

The 4-oxo - 2,3,4,5,6,7 - hexahydrobenzo[b]thiophene compounds of this invention are dehydrogenated to produce 4-hydroxy-3-(and 2-)alkylbenzo[b]thiophenes and 2,3-dihydro derivatives thereof. The dehydrogenation can be carried out in the vapor phase, in the absence of added hydrogen, using water in the feed and a metal oxide catalyst of Groups VI-B and VIII (iron sub-group) metals, as defined in U.S. Pat. No. 3,345,382. The dehydrogenation can be carried out in the liquid phase by applying the procedures of U.S. Pat. No. 3,317,552, i.e., heating a solution of elemental sulfur and the oxo-compound in a solvent for both the sulfur and the oxo-compound.

The resulting 4-hydroxy compound can be converted to carbamate insecticides and pesticides. Typically the carbamates are formed by reacting the hydroxy compound with an isocyanate, such as alkylisocyanate, or with phosgene and then with an amine, cf. U.S. 3,288,673.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. The method for producing 4-oxo-2,3,4,5,6,7-hexahydrobenzo[b]thiophenes that comprises reacting a compound having the formula:

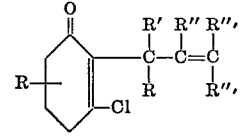

wherein R, R', R", R''' and R'''' are hydrogen or alkyl ($C_1$–$C_3$) with sodium hydrosulfide.

2. The method of claim 1, wherein R, R', R", R''', and R'''' are hydrogen.

3. The method of claim 1, wherein R, R', R''', and R'''' are hydrogen and R" is alkyl ($C_1$–$C_3$).

4. The method of claim 3, wherein R" is methyl.

References Cited
UNITED STATES PATENTS

| | | | |
|---|---|---|---|
| 3,288,808 | 11/196 | Kilsheimer et al. | 260—330.5 |
| 3,317,552 | 5/1967 | Kaufman et al. | 260—330.5 |

HENRY R. JILES, Primary Examiner

C. M. S. JAISLE, Assistant Examiner

U.S. Cl. X.R.

260—586 R, 330.5, 332.3 R

UNITED STATES PATENT OFFICE
CERTIFICATE OF CORRECTION

Patent No. 3,743,655      Dated July 3, 1973

Inventor(s) Jerry G. Strong

It is certified that error appears in the above-identified patent and that said Letters Patent are hereby corrected as shown below:

In the title "OZO" should be --OXO--.

Signed and sealed this 18th day of December 1973.

(SEAL)
Attest:

EDWARD M. FLETCHER, JR.       RENE D. TEGTMEYER
Attesting Officer      Acting Commissioner of Patents